United States Patent

White

[15] 3,683,326
[45] Aug. 8, 1972

[54] ECHO RANGER BOREHOLE SCANNER

[72] Inventor: James E. White, 1703 Douglas Ave., Midland, Tex. 79701

[22] Filed: March 2, 1970

[21] Appl. No.: 15,698

Related U.S. Application Data

[63] Continuation-in-part of Ser. No. 761,264, Sept. 20, 1968, abandoned, Continuation-in-part of Ser. No. 609,369, Feb. 11, 1967, abandoned.

[52] U.S. Cl. ........................340/15.5 SW, 340/18 P
[51] Int. Cl. ..............................................G01v 1/13
[58] Field of Search......................340/15.5 SW, 18 P

[56] References Cited

UNITED STATES PATENTS 3,213,358  10/1965  Piety..........................340/15.5
3,376,950  4/1968  Grine..........................340/15.5

*Primary Examiner*—Benjamin A. Borchelt
*Assistant Examiner*—N. Moskowitz
*Attorney*—Joseph C. Herring, Richard C. Willson, Jr. and Jack L. Hummel

[57] ABSTRACT

Echo ranging detects inhomogeneities spaced a distance from a borehole by:
  a. Generating within the borehole a spatial pattern of forces so as to radiate into the media surrounding the borehole a wave field having a predetermined spatial pattern,
  b simultaneously sensing echoes with a detector which is substantially insensitive to forces corresponding to said predetermined spatial pattern when said generator is radiating into a medium which is completely symmetrical about the axis of said borehole whereby said detector discriminates against directly transmitted waves having said predetermined spatial pattern and detects echoes and other waves not corresponding to said predetermined spatial pattern.

Echo ranging is valuable for the location of subterranean geological structures, e.g., in the exploration for petroleum and other minerals.

18 Claims, 5 Drawing Figures

INVENTOR
JAMES E. WHITE

INVENTOR
JAMES E. WHITE
BY
ATTORNEY

ECHO RANGER BOREHOLE SCANNER

CROSS REFERENCES TO RELATED APPLICATIONS

This application is a continuation-in-part of my copending U.S. Pat. application Ser. No. 761,264, filed Sept. 20, 1968 which is a continuation-in-part of my then copending U.S. Pat. application Ser. No. 609,369, filed Feb. 11, 1967 both of which are now abandoned.

The techniques of the present invention are somewhat related to those of U.S. Pat. No. 3,475,772 which issued on Oct. 28, 1969, of the present inventor and which is assigned to the assignee of the present invention.

BACKGROUND OF THE INVENTION

Seismic prospecting by generation of acoustic waves which are detected by a series of geophones is a highly developed art. Most seismic prospecting has hitherto been confined to the surface of the earth and attempts to generate and/or detect with generators or detectors located below the surface in boreholes have been complicated by the very severe transmission of direct waves down the borehole, particularly where the generator and the detector are located in the same borehole.

The present invention deliberately "tags" the direct waves from the generator by providing them with certain identifiable characteristics and then deliberately discriminates against these tagged waves so that waves directly transmitted along the borehole (or through the earth) are, in essence at least, partially canceled out in the detection process. Thus it is possible by the techniques of the present invention to observe the reflected waves which are much smaller in magnitude without severe masking of these reflected waves by the directly transmitted waves.

SUMMARY OF THE INVENTION

In short, the present invention provides a generator which generates a spatial pattern of forces which in turn radiate into the surrounding media a wave field with a predetermined spatial pattern, together with a detector which is largely or completely insensitive to wave fields having the aforesaid predetermined spatial pattern, as this pattern exists in a medium which is symmetrical about the axis of the borehole. The present invention therefore permits the cancelation out or discrimination against all effects which would occur if the surrounding media were symmetrical. Thus the principal signals received by the generator are those due to inhomogeneities in the surrounding media. Since it is these inhomogeneities which are of primary interest to the exploratory geophysicist, the present invention detects a maximum of interesting "signal" while minimizing the detection of "noise" coming directly from the generator to the detector.

A variety of spatial patterns may be used to tag the generated wave fields, but the identifying charactetistics utilized should be selected so as to be resistant to being severely distorted or eliminated by passage of the waves through the media surrounding the borehole. Time dependent patterns such as modulations in frequency or amplitude with respect to time, will in general, be sufficiently distorted in passage through the surrounding media as to be of very limited value with the present invention. Spatially dependent wave patterns are therefore preferred, and of these, the torsional wave pattern generated by exerting forces tangential to the sides of the borehole at points on opposite sides of the borehole. This can readily be done, either mechanically, e.g., by a rotating weight or series of weights striking lugs located on opposite sides of the interior of the borehole, or by the use of pairs of transducers suitably oriented. Likewise the detectors can be any suitable type of inertial motion detector and the number of detector and generator elements is not critical, though four or more of each is preferred.

Stated otherwise, it may be said that the present invention comprises the use of a wave generator having positive symmetry about the axis of the borehole in conjunction with a wave detector having negative (that is, mirror image or opposite algebraic sign) symmetry about the borehole or vice versa. That is, if the the wave pattern from the generator consists of forces directed radially outward from the borehole (such as shown in the top circle of FIG. 2b) the detector will emit an electrical signal in response to the forces which impinge on a first detection point, and at a detection point directly across the axis from the first point, the detector will emit an electrical signal having exactly the same magnitude and opposite polarity when the detector is energized by an exactly equal force so directed. And this will be true at all pairs of opposite points anywhere on the sensitive areas of the detector.

By the above stated "vice versa" is meant that the generator may have negative symmetry, (that is, may cause forces which radiate inward on one side and outward on the other or are otherwise similarly equal and opposite on opposite sides of the generator) while the corresponding detector may then have positive symmetry, (that is, for example, emit a positive electrical signal when energized by a force acting inwardly toward the borehole and a negative signal when energized by a force acting outwardly on the borehole regardless of which of the sensitive portions of the detector are energized).

Similarly, the detectors for use with the present invention can be varied to provide the required discrimination against the particular spatial pattern being generated. Particularly preferred for use with torsional wave forms will be barium titanate cylinder quadrants (such as those made by halving 180° sections available from Gulton Industries, Metuchen, New Jersey, Inc., and described in their catalogue Sect. 3, Pressure Transducers marked 3M–7–59) positioned so that the cylinder has an axis along the axis of the borehole. Other configurations and other transducer materials or other detector types may be employed. Preferably the detectors are inertial motion detection devices. "Motion detectors" as used herein includes all manner of devices for quantitatively determining motion such as moving-coil devices, e.g., geophones; transducers, e.g., mass-loaded barium-titanate cylinders; strain gauges, e.g., a mass suspended from a strain gauge element; accelerometers, e.g., rotational accelerometers; motion detectors sensitive to direct acoustic pressure, e.g., hydrophones; and many other conventional devices which will be apparent to those skilled in the art. Except as noted in the application, these devices may be interchanged to achieve particular desired results.

DESCRIPTION OF THE DRAWINGS

FIG. 2A shows a torsional wave pattern, and FIG. 2B shows a spatial pattern of waves having equal forces directed outward from the borehole at points spaced equally around the borehole.

DESCRIPTION OF THE PREFERRED EMBODIMENTS

Figure 1:
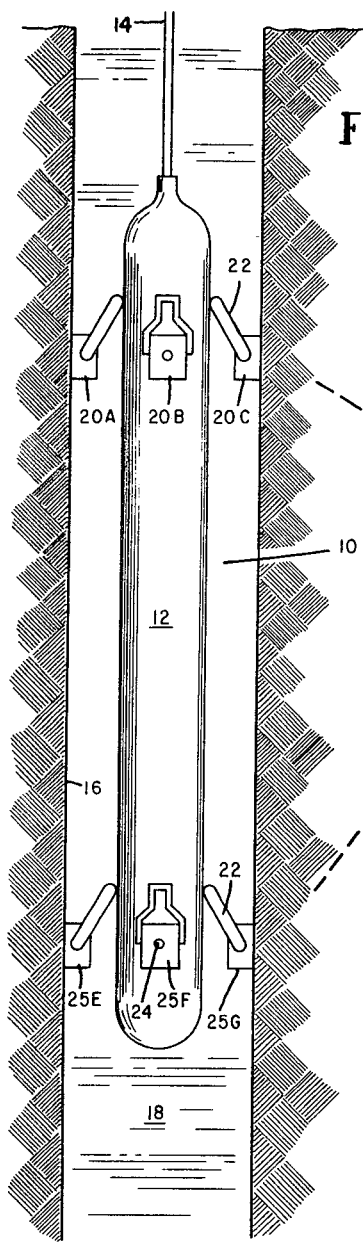
FIG. 1 is a schematic diagram of a preferred embodiment of the present invention showing the generator and detector in a system using a torsional spatial wave pattern.

FIG. 1 shows an echo ranging device 10 including a long cylindrical housing 12 suspended by cable 14 and a borehole 16 which is forced through drilling mud or fluid 18. The cable 14 thus supports the device 10 and also carries all of the necessary electrical wires for communicating with the generator 20 and detector 25 located further downhole. A plurality of transducer units 20 are pedestally mounted on the generator housing 12 by bracket arms 22 which urge the units into direct contact with the walls of the borehole 16 by means of bias springs within the housing (not shown). Each of these transducing units engages the borehole wall at only one point through rigid contact button 24. Each of the transducing units actually contains three transducers arranged perpendicularly to one another according to the description and according to FIG. 2 of the aforementioned U.S. Pat. No. 3,475,772 which issued on Oct. 28, 1969.

Figure 4:
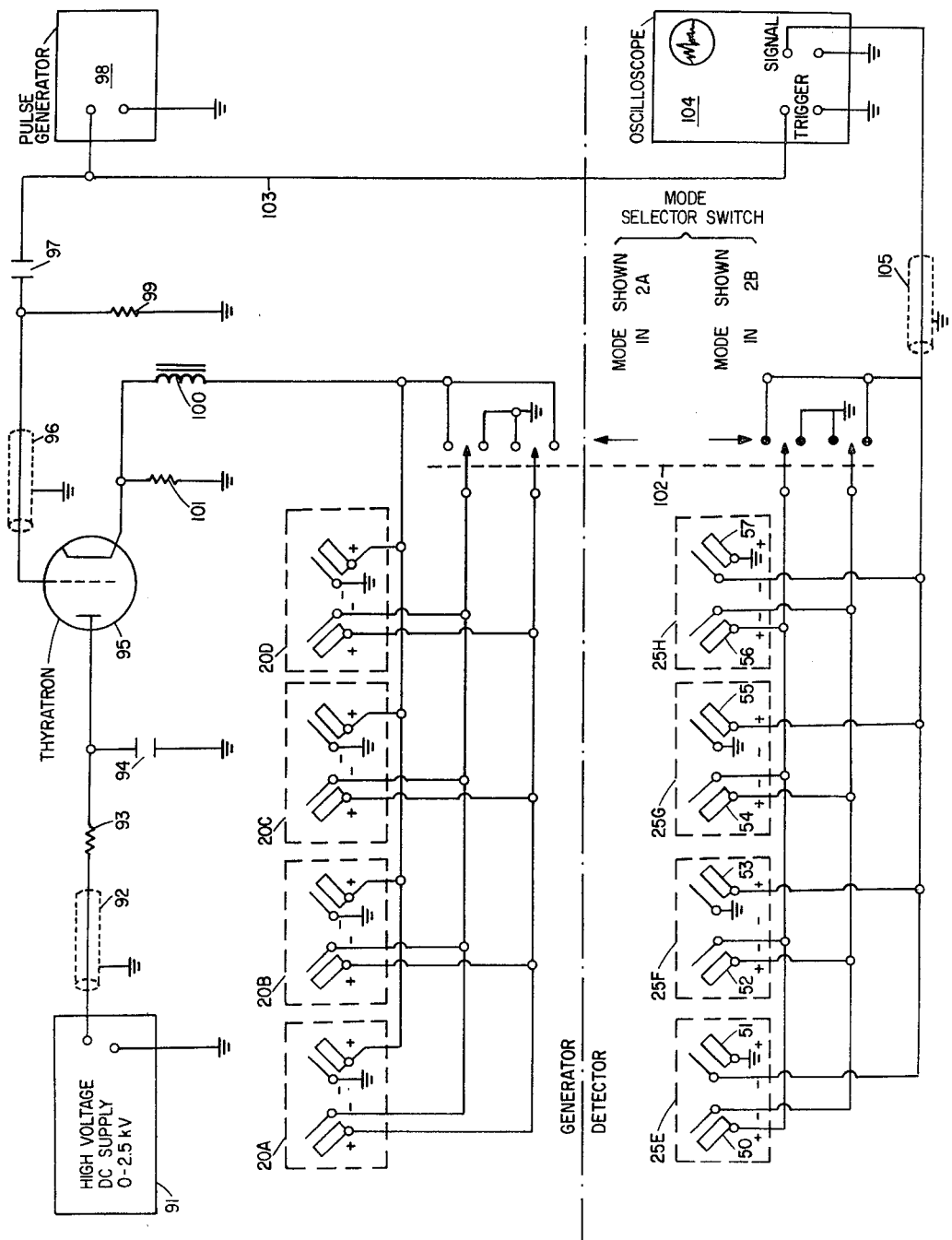
FIG. 4 is a block diagram of the circuitry contained in the generator and in the receiver.

FIG. 4 shows circuitry which can be used with the device of FIG. 1. For simplicity, only two of the three transducers arranged perpendicularly to each other, are shown. It should be made clear that the present invention will operate with one transducer in each of the transducer units 20, or may instead have two, or most preferably three transducers in each of the units. Also, while the transducer elements are most preferably mounted on axes which are perpendicular to each other, this perpendicular mounting is not essential to the invention.

In FIG. 4, element 91 is a high voltage DC power supply, preferably having an output of from about 0 to 2.5 kilovolts, e.g., the Kepco ABC 2500 M (0–2.5 kV) manufactured by Kepco, Inc., 131–38 Sanford Avenue, Flushing, New York, 11352. The high voltage power supply 91, is connected through shielded cable 92, and resistance 93, e.g., 150k ohms, to capacitor 94, e.g., 0.005 microfarads to thyratron 95, e.g., thyratron type 6268 manufactured by Amprex Electronic Corporation, 230 Duffy Avenue, Hicksville, New York. The thyratron is preferably located downhole and is connected by shielded cable 96 to capacitor 97, e.g., 0.02 microfarads and to pulse generator 98, e.g., the HP211B model manufactured by Hewlitt Packard of 1501 Page Mill Road, Palo Alto, California, 94304, used in conjunction with a voltage amplifier. Resistor 99 has an appropriate resistance, e.g., 33k ohms so as to give a short time constant. Inductance 100, e.g., 100 millihenries and resistance 101, e.g., 6.8k ohms are chosen so as to provide an oscillitory output when connected to the net capacitance of the transducers so as to impart to the formation the desired impulsive force of short duration.

Generator transducer 20A, 20B, 20C, and 20D are those corresponding to the upper units shown in contact with the borehole in FIG. 1. Each of these transducer units is shown as containing two transducers. (As mentioned above, 1, 2, 3, or even more could be utilized.) Each transducer has a positive and a negative pole, arbitrarily designated by plus and minus, respectively in FIG. 4. For purposes of explanation, the transducer units 20A, 20B, 20C, and 20D may be considered as being located in contact with the borehole 16 at points A, B, C, and D, respectively, of either FIG. 2A or FIG. 2B.

Figure 2A:
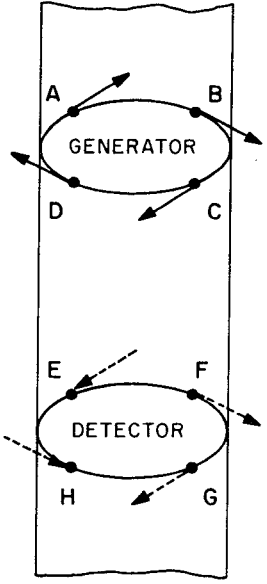
FIGS. 2A and 2B show two preferred spatially dependent wave patterns.

Transducer generator units 20A through 20D are connected by a gang-switch 102 so that when the switch is thrown in the upward direction the transducer generator units apply torsional forces to the borehole 16 as shown schematically in FIG. 2A. When the gang-switch is in the downward position, transducer generator units 20A through 20D apply the radial pattern of forces shown schematically in FIG. 2B.

Lead 103 connects the pulse generator 98, generally located uphole, to the display device, e.g., oscilloscope 104. A suitable oscilloscope is the Tektronix 535, manufactured by Tektronix, Inc. of Beaverton, Oregon. The display device could instead be a high-speed digital read-out device or other conventional display device. The oscilloscope or other display device will generally be located uphole. The oscilloscope will have a conventional sweep. A suitable camera may be employed with the oscilloscope such as the Tektronix C–19. Shielded cable 105 connects oscilloscope 104 with the downhole detector transducer units 25E, 25F, 25G, and 25H. Each of the detector transducer units 25E through 25H consists of a pair of transducers (one or three transducers may be used instead, as mentioned above) shown, for example, as 50 and 51 in detector transducer unit 25E. Each of these transducers has a positive and negative pole, arbitrarily designated by plus and minus in FIG. 4. The transducers are connected together through gangswitch 102 which also controls the operation of the generator transducers as mentioned above.

Figure 2B:
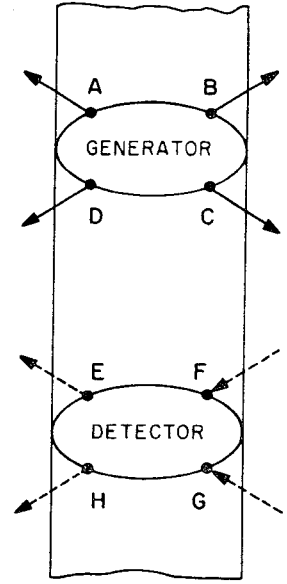

For clarity of explanation, detector transducer units 25E through 25H are located at points E through H of FIGS. 2A and 2B. Though four detector transducer units are shown in this preferred embodiment, it should be understood that a greater or lesser number of transducer units could be utilized. It is fundamental to the present invention that the transducers must be arranged in pairs consisting of two transducers in contact with points on opposite sides of the borehole and so connected that the electrical signals from the first and second transducer in each of the pairs are combined to produce an electrical signal which is zero when the transducers comprising that pair are each sensing forces which are identical in magnitude and opposite in direction and so that the combined electrical signal from the pair of transducers is twice that emitted from either one of the transducers when the transducers comprising that pair are each sensing forces which are identical in magnitude and identical in direction.

At the lower portion of housing 12 (preferably about 3 to about 10 feet in most common instances, from the elevation of the generator 20A–20D) there are pedestally mounted detectors 25 identical with generators 20A–20D except that they are electrically connected through cable 14 to a surface recorder. The detectors 25E–25H contain identical perpendicularly mounted transducers to those contained within the generators 20 and the detectors 25 are pedestally mounted on spring arms 22 identical to those used for mounting the generators and similarly biased by springs so as to cause the detectors to press against the walls of the borehole via raised buttons 24.

In operation, the echo-logging apparatus shown in FIG. 1 is caused to generate a suitable signal by properly energizing the transmitter transducers so that the resultant forces imparted to the borehole wall through the contact buttons 24 may be horizontally oriented and tangential to the borehole as shown in FIG. 2A (or may be directed outward from the center point of the borehole as shown in FIG. 2B or may be otherwise suitably directed).

That is, by simultaneously pulsing each of the transducers in each of the generator transducer units 20A through 20D with signals of selected magnitude and polarity, the point force vector generated by each transducer unit may be accurately controlled. The relative signal weighting between the transducer elements required to produce such force vectors may be easily determined, and is dependent on the orientation of each of the transducer assemblies within its housing.

Referring to the circuitry shown in FIG. 4, the pulse generator 98 acting in conjunction with capacitor 97 and resistor 99, transmits to the thyratron tube a series of sharp pulses occurring at a frequency of several per second. These pulses trigger the thyratron 95 which discharges capacitor 94 through the pulse-forming network consisting of elements 100 and 101 and through the generator transducers 20A through 20D. The generator transducers thus are excited by a short oscillitory voltage which causes them to exert forces on the wall of the borehole. With gang-switch 102 in the upward position the force pattern generated by the generator transducers is that shown in FIG. 2A. With the gang-switch in the downward position the force pattern generated is that shown in FIG. 2B. Each of the alternate force patterns radiates into the surrounding medium waves which have positive symmetry.

To eliminate any possible ambiguity of the invention the following convention is adopted. Each generator transducer and each detector transducer has a directional axis and there is a relationship between the plus and minus electrical terminals and the directional axis. For the generator transducers, the relationship is such that if a positive electrical charge is connected to the plus electrical terminal of the generator transducer and if a corresponding negative electrical charge is connected to the minus electrical terminal of the generator transducer, a force is produced along the directional axis in a given direction. The forces and the directions along the directional axes of the generator transducers will be the same for each generator transducer when identical charges are connected to identical electrical terminals. For the detector transducers the relationship between the electrical terminals and the directional axis is such that if a force is applied to a detector transducer along the directional axis in a given direction, the electrical charge at the plus terminal will be positive and the electrical charge at the minus terminal will be negative. For each of the detector transducers, the electrical response will be identical for identical forces applied in identical directions along the directional axes. It should be understood that if opposite charges are connected to the same electrical terminals of a generator transducer, the force produced by the generator transducer will have the same magnitude as that mentioned above but the force will be in the opposite direction along the directional axis as that mentioned above. If a force is applied in the opposite direction along the directional axis of the detector transducer, the charge on the plus electrical terminal will be negative and the charge on the minus electrical terminal will be positive. Although the designation of the electrical terminals is arbitrary with respect to which direction along the directional axis they represent, once the direction along the directional axis is related to the electrical terminals, the relationship is maintained throughout the system.

Waves arriving at the detector transducer units 25E through 25H cause voltages to be generated by each of the transducers 50 through 57. Each of the transducers is paired with an identical transducer located in contact with the opposite side of the borehole. The members of each transducer pair are identically oriented within their respective transducer units so that the directional axis of each is at the same angle with respect to the cylindrical coordinates of the borehole. For example, transducer 50 is located within detector transducer unit 25E and is positioned with respect to the borehole identically with transducer 54 which is located within detector transducer unit 25G. As shown in the circuit diagram transducers 50 and 54 are connected with opposite polarity (that is with their output voltages combined electrically so as to subtract when they are subjected to forces of equal magnitude having the same orientation with respect to the cylindrical coordinates of the borehole). Thus, when the symmetrical pattern of forces generated in FIG. 2A is transmitted down the borehole 16 and acts on the transducers 50 and 54, the net electrical output is zero. When a symmetrical wave 40 encounters an inhomogeneity in the formation 42 creating a non-symmetrical reflected wave 41, this reflected wave is not balanced by any wave on the opposite side of the borehole. When reflected wave 41 arrives at detector transducer unit 25G it exerts a force which excites transducer 54. The same reflection, arriving at transducer unit 25E, exerts a force which excites transducer 50. For low frequency waves, the two forces have approximately the same magnitude and (compass) direction, the electrical signal due to transducer 50 is approximately the same as that due to transducer 54, and the output of the pair is approximately twice the electrical signal due to either. In no case will the forces be equal in magnitude and opposite in (compass) direction (equal in both magnitude and direction relative to cylindrical coordinates of the borehole). Therefore, the net electrical signal from the pair formed by transducers 50 and 54 will be greater than zero and will cause a display on the oscilloscope.

Although all of the other transducers have been ignored in describing the above operation of the pair of transducers 50 and 54, each of the other transducer pairs will behave similarly. In short, each of transducer pairs 51 and 55, 52 and 56, 53 and 57, is connected so as to behave in the manner described regardless of the position of gang-switch 102. Each pair will therefore discriminate against symmetrical wave patterns and detect unsymmetrical wave patterns.

Preferably all of the longer cables employed are shielded to minimize cross-talk and interference. The preferred oscilloscope mentioned above contains gating circuits which are useful to delay the sweep presentation for a time sufficient to allow symmetrical waves such as 40 to travel to the inhomogeneity such as 42 and return as unsymmetrical waves such as 41. This delay may be varied to permit searching for inhomogeneities at different desired distances from the borehole. The oscilloscope sweep is initiated by a trigger pulse traveling along cable 103 from the pulse generator 98.

The tangential force pattern of FIG. 2A acts to twist or rotate the borehole 16 and thus sets up a shear wave which propagates through the formation. Since the force pattern is purely tangential and all of the force vectors act in the same relative direction, i.e., clockwise, no compression waves are created, and since these forces are applied directly to the walls of the borehole rather than being communicated through the drilling fluid, no strong fluid borne signals are developed.

However, relatively strong waves may be transmitted either along the casing if the borehole is cased, or through the immediately adjacent formation surrounding the borehole. These strong forces may be transmitted downward from the receiver to the detector transducers 25. Since the purpose of the present invention is echo logging and not borehole logging these directly transmitted signals are of no interest. It is an important aspect of the present invention that these uninteresting signals which are directly transmitted from the generator to the receiver are discriminated against by the particular detectors employed, or by the manner in which the electrical signals generated by the various electrical transducers in the detectors are combined.

This discrimination and the improved signal - (that is, reflected waves (echoes) which are of interest in echo logging) - to - noise (that is, directly transmitted uninteresting signals) ratio are achieved by combining the electrical signals produced by the individual detector transducer elements so as to cancel space dependent wave patterns of the type which are directly transmitted from the generator to the receiver. For example, when the torsional wave pattern of FIG. 2A is being generated, the outputs of detector elements 25 are combined by subtracting from each other the signals detected by opposing elements. An attempt to depict this is made in the lower circles of FIGS. 2A and 2B. Thus, in FIG. 2A the dotted arrows indicate components of motion which, when sensed by the detectors, will give a positive electrical signal in the detector outputs. It should be noted that the arrows of the detector circle of FIG. 2A (and of FIG. 2B) are so oriented with respect to the arrows of the generator that if waves having the pattern shown in the generator circle are transmitted directly down the borehole, or the surrounding formation (by twisting in the case of FIG. 2A or by outward expansion of the borehole in the case of FIG. 2B) the respective detectors would tend to register zero electrical output on receiving such wave patterns. The detector configuration of FIG. 2B may also be used to advantage with the generator configuration of FIG. 2A, and detector of FIG. 2A with the generator of FIG. 2B.

It should be noted that it is important to the present invention to choose detector configurations which will both discriminate against the waves received directly from the generator and will still sense the waves which are received from reflections caused by inhomogeneities or lack of symmetry in the surrounding formation. Referring once again to FIG. 1, 40 is a schematic illustration of a wave propagating outward from the generators 20 and being reflected back from a fault face or other geological inhomogeneity 42 toward detectors 25 along the route shown schematically as 41. (It should be stressed that the fault face may be located at some considerable distance, e.g., hundreds of feet away from borehole 16 and that the dimensions of the drawing are not to scale.)

Returning wave 41 is different from waves traveling directly from generators 20 to detectors 25 in one important aspect. This important difference is that because, in almost no case, will there be identical inhomogeneities on exactly opposite sides of the borehole 16, wave 41 will not be accompanied by an equal and opposite wave or force while all of the waves moving directly between the generator and the detector will, in each instance, consist of force patterns which are such that each force will be accompanied by an equal and opposite force on the other side of the borehole.

Figure 3:
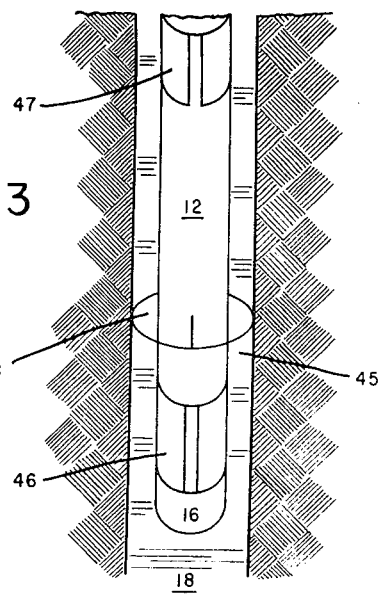
FIG. 3 shows a modification of the apparatus employing barium titanate cylinder segments for both generators and detectors.

For example, in FIG. 3, there is shown a preferred modification of the present invention in which the detectors 46 are barium titanate cylinder segments which receive signals through the drilling mud 18 and transmit them conventionally to a surface recorder via cable 14. This type of detector can be employed with the type of generator shown in FIG. 1 and in fact, is especially preferred for this purpose where torsional waves of the type shown in FIG. 2A are to be generated because the drilling mud will then act as a mechanical damper which prevents such torsional waves from arriving at the detectors 46. Thus, it should be noted that mechanical configuration as well as electrical combination can be utilized to achieve the discrimination of the invention.

In FIG. 3, the echo logging device employs similar barium titanate segments to act as the generators 47 in place of the previously described generators 20 of FIG. 1. This provides a smooth echo logging instrument which does not require contact with the borehole and may therefore be readily raised and lowered, a centralizer 48 being provided to maintain the echo logging tool concentric with the borehole.

Of course, the generator shown in FIG. 3 is incapable of generating the type of space pattern shown in FIG. 2A, but it is entirely satisfactory with the type of space pattern shown in FIG. 2B and with a wide variety of other space patterns which may be selected to accommodate the particular geology and conditions encountered in the field.

By eliminating the principal source of noise, the direct transmission of signals between the generator and the detector, the present invention permits the detection and study of reflected signals much smaller in magnitude. Since a completely homogeneous formation would not cause reflection of signals, and since substantially only reflected signals are detected by the methods of the present invention, only those signals which are reasonably indicative of inhomogeneities in the formation, are detected.

Various other space dependent wave patterns can be utilized with the present invention and, to produce a maximum of information, it will generally be desirable to successively produce a series of different wave patterns in each case modifying the arrangement of the transducers so as to render them substantially incapable of detecting the particular wave pattern being generated at the time in question. Other techniques of seismography and borehole logging, e.g., varying of the distance between the generator and the detector, individually recording the signals from each of the detector transducers for later addition by computer, use of waves of varying frequency, etc. may be employed with the present invention.

What is claimed is:

1. In an echo ranging method for detecting formation inhomogeneities spaced a distance from a borehole by radiating into the formation surrounding the borehole a wave field having a predetermined spatial pattern by operating a generator within the borehole to generate forces which are equal and opposite in compass direction on opposite sides of the generator, locating a first motion detector on a first side of the axis of said borehole at a distance from said generator, and locating a second motion detector on a substantially opposite side of the axis of said first motion detector, each motion detector having a directional axis and a plus and a minus electrical output terminal, simultaneously sensing echoes with said first and said second motion detector, said first and said second motion detectors emitting electrical signals which are equal and identical in polarity when sensing forces which are equal in magnitude and identical in direction with reference to the directional axis; and displaying said signal, the improvements comprising:
   a. positioning the axes of said motion detectors so that the first motion detector emits a positive signal in response to a given force received from said formation and the second motion detector emits an equal positive signal in response to the same force, and
   b. connecting the plus terminal of said first motion detector with the plus terminal of said second motion detector to provide a combined electrical signal, said combined signal being 0 when the motion detectors each sense forces which are identical in magnitude and opposite in direction.

2. In an echo ranging borehole tool comprising a generator having at least one pair of generator transducers; said generator transducers being spaced laterally and located on opposite sides of the axis of the borehole; each of said generator transducers having a directional axis, an electrical terminal arbitrarily designated plus and an electrical terminal arbitrarily designated as minus; at least one pair of detector transducers spaced along the axis of said borehole from said generator transducers; said detector transducers spaced substantially laterally and located on opposite sides of the axis of said borehole; each of said detector transducers having a directional axis, an electrical output terminal arbitrarily designated as plus and an electrical output terminal arbitrarily designated as minus; display means for displaying electrical signals from said detector transducers; said display means having at least two electrical input terminals; pulse generator means for simultaneously delivering an electrical pulse to the terminals of each of said generator transducers and to said display means; said pulse generator means having at least two electrical output terminals; an electrical connection between said pulse generator means and said display means; the improvement comprising (a) orientation of said pair of generator transducers such that the directional axis of one generator transducer is opposite in compass direction to the directional axis of the second generator transducer, electrical connection between a first electrical output terminal of the pulse generator and both plus electrical terminals of the generator transducers, electrical connection between a second electrical output terminal of the pulse generator and both minus electrical terminals of the generator transducers in combination with (b) orientation of said pair of detector transducers such that the directional axis of one detector transducer is opposite in compass direction to the directional axis of the second detector transducer, electrical connection between a first electrical terminal of the display means and the minus electrical output terminal of a first detector transducer, electrical connection between both plus electrical output terminals of the detector transducers, electrical connection between the minus electrical output terminal of a second detector transducer and a second electrical input terminal of the display means.

3. In an echo ranging borehole tool comprising a generator having at least one pair of generator transducers; said generator transducers being spaced laterally and located on opposite sides of the axis of the borehole; each of said generator transducers having a directional axis, an electrical terminal arbitrarily designated plus and an electrical terminal arbitrarily designated as minus; at least one pair of detector transducers spaced along the axis of said borehole from said generator transducers; said detector transducers spaced substantially laterally and located on opposite sides of the axis of said borehole; each of said detector transducers having a directional axis, an electrical output terminal arbitrarily designated as plus and an electrical output terminal arbitrarily designated as minus; display means for displaying electrical signals from said detector transducers; said display means having at least two electrical input terminals; pulse generator means for simultaneously delivering an electrical pulse to the terminals of each of said generator transducers and to said display means; said pulse generator means having at least two electrical output terminals; an electrical connection between said pulse generator means and said display means; the improvement comprising (a) orientation of said pair of generator transducers such that the directional axis of one generator transducer is opposite in compass direction to the directional axis of the second generator transducer, electrical connection between a first electrical output terminal of the pulse generator means and both plus electrical terminals of the generator transducers, electrical connection between a second electrical output terminal of the pulse generator means and both minus electrical terminals of the generator transducers in combination with (b) orientation of said pair of detector transducers such that the directional axis of one detector transducer is opposite in compass direction to the directional axis of the second detector transducer, electrical connection between a first electrical input terminal of the display means and the minus electrical output terminal of a first detector transducer and the plus electrical output terminal of a second detector transducer, electrical connection between a second electrical input terminal of the display means and the plus electrical output terminal of the first detector transducer and the minus electrical output terminal of the second detector transducer.

4. In an echo ranging borehole tool comprising a generator having at least one pair of generator transducers; said generator transducers being spaced laterally and located on opposite sides of the axis of the borehole; each of said generator transducers having a directional axis, an electrical terminal arbitrarily designated plus and an electrical terminal arbitrarily designated as minus; at least one pair of detector transducers spaced along the axis of said borehole from said generator transducers; said detector transducers spaced substantially laterally and located on opposite sides of the axis of said borehole; each of said detector transducers having a directional axis, an electrical output terminal arbitrarily designated as plus and an electrical output terminal arbitrarily designated as minus; display means for displaying electrical signals from said detector transducers; said display means having at least two electrical input terminals; pulse generator means for simultaneously delivering an electrical pulse to the terminals of each of said generator transducers and to said display means; said pulse generator means having at least two electrical output terminals; an electrical connection between said pulse generator means and said display means; the improvement comprising (a) orientation of said pair of generator transducers such that the directional axis of one generator transducer is opposite in compass direction to the directional axis of the second generator transducer, electrical connection between a first output terminal of the pulse generator means and both plus electrical terminals of the generator transducers, electrical connection between a second output terminal of said pulse generator means and both minus electrical terminals of the generator transducers in combination with (b) orientation of said pair of detector transducers such that the directional axis of one detector transducer is identical in compass direction to the second detector transducer, electrical connection between a first electrical input terminal of the display means and the minus electrical output terminal of a first detector transducer, electrical connection between the plus electrical output terminal of the first detector transducer and the minus electrical output terminal of a second detector transducer, electrical connection between the plus electrical output terminal of the second detector transducer and a second electrical input terminal of the display means.

5. In an echo ranging borehole tool comprising a generator having at least one pair of generator transducers; said generator transducers being spaced laterally and located on opposite sides of the axis of the borehole; each of said generator transducers having a directional axis, an electrical terminal arbitrarily designated plus and an electrical terminal arbitrarily designated as minus; at least one pair of detector transducers spaced along the axis of said borehole from said generator transducers; said detector transducers spaced substantially laterally and located on opposite sides of the axis of said borehole; each of said detector transducers having a directional axis, an electrical output terminal arbitrarily designated as plus and an electrical output terminal arbitrarily designated as minus; display means for displaying electrical signals from said detector transducers; said display means having at least two electrical input terminals; pulse generator means for simultaneously delivering an electrical pulse to the terminals of each of said generator transducers and to said display means; said pulse generator means having at least two electrical output terminals; an electrical connection between said pulse generator means and said display means; the improvement comprising (a) orientation of said pair of generator transducers such that the directional axis of one generator transducer is opposite in compass direction to the directional axis of the second generator transducer, electrical connection between a first electrical output terminal of the pulse generator means and both plus electrical terminals of the generator transducers, electrical connection between a second electrical output terminal of the pulse generator means and both minus electrical terminals of the generator transducers in combination with (b) orientation of said pair of detector transducers such that the directional axis of one detector transducer is identical in compass direction to the directional axis of the second detector transducer, electrical connection between a first electrical input terminal of the display means and both plus electrical output terminals of the detector transducers, electrical connection between a second electrical input terminal of the display means and both minus electrical output terminals of the detector transducer.

6. In an echo ranging borehole tool comprising a generator having at least one pair of generator transducers; said generator transducers being spaced laterally and located on opposite sides of the axis of the borehole; each of said generator transducers having a directional axis, an electrical terminal arbitrarily designated plus and an electrical terminal arbitrarily designated as minus; at least one pair of detector transducers spaced along the axis of said borehole from said generator transducers; said detector transducers spaced substantially laterally and located on opposite sides of the axis of said borehole; each of said detector transducers having a directional axis, an electrical output terminal arbitrarily designated as plus and an electrical output terminal arbitrarily designated as minus; display means for displaying electrical signals from said detector transducers; said display means having at least two electrical input terminals; pulse generator means for simultaneously delivering an electrical pulse to the terminals of each of said generator transducers and to said display means; said pulse generator means having at least two electrical output terminals; an electrical connection between said pulse generator means and said display means; the improvement comprising (a) orientation of said pair of generator transducers such that the directional axis of one generator transducer is identical in compass direction to the directional axis of the second generator transducer, electrical connection between a first electrical output terminal of the pulse generator means and the plus electrical terminal of a first generator transducer and the minus electrical terminal of a second generator transducer, electrical connection between a second electrical output terminal of the pulse generator means and the minus electrical terminal of the first generator transducer and the plus electrical terminal of the second generator transducer in combination with (b) orientation of said pair of detector transducers such that the directional axis of one detector transducer is identical in compass direction to the directional axis of the second detector transducer, electrical connection between a first electrical input terminal of the display means and the minus electrical output terminal of a first detector transducer, electrical connection between the plus electrical output terminal of the first detector transducer and the minus electrical output terminal of a second detector transducer, electrical connection between the plus electrical output terminal of the second detector transducer and a second electrical input terminal of the display means.

7. In an echo ranging borehole tool comprising a generator having at least one pair of generator transducers; said generator transducers being spaced laterally and located on opposite sides of the axis of the borehole; each of said generator transducers having a directional axis, an electrical terminal arbitrarily designated plus and an electrical terminal arbitrarily designated as minus; at least one pair of detector transducers spaced along the axis of said borehole from said generator transducers; said detector transducers spaced substantially laterally and located on opposite sides of the axis of said borehole; each of said detector transducers having a directional axis, an electrical output terminal arbitrarily designated as plus and an electrical output terminal arbitrarily designated as minus; display means for displaying electrical signals from said detector transducers; said display means having at least two electrical input terminals; pulse generator means for simultaneously delivering an electrical pulse to the terminals of each of said generator transducers and to said display means; said pulse generator means having at least two electrical output terminals; an electrical connection between said pulse generator means and said display means; the improvement comprising (a) orientation of said pair of generator transducers such that the directional axis of one generator transducer is identical in compass direction to the directional axis of the second generator transducer, electrical connection between a first electrical output terminal of the pulse generator means and the plus electrical terminal of a first generator transducer and the minus electrical terminal of a second generator transducer, electrical connection between a second electrical output terminal of the pulse generator means and the minus electrical terminal of the first generator transducer and the plus electrical terminal of the second generator transducer in combination with (b) orientation of said pair of detector transducers such that the directional axis of one detector transducer is identical in compass direction to the directional axis of the second detector transducer, electrical connection between a first electrical input terminal of the display means and both plus electrical output terminals of the detector transducers, electrical connection between a second electrical input terminal of the display means and both minus electrical output terminals of the detector transducers.

8. In an echo ranging borehole tool comprising a generator having at least one pair of generator transducers; said generator transducers being spaced laterally and located on opposite sides of the axis of the borehole; each of said generator transducers having a directional axis, an electrical terminal arbitrarily designated plus and an electrical terminal arbitrarily designated as minus; at least one pair of detector transducers spaced along the axis of said borehole from said generator transducers; said detector transducers spaced substantially laterally and located on opposite sides of the axis of said borehole; each of said detector transducers having a directional axis, an electrical output terminal arbitrarily designated as plus and an electrical output terminal arbitrarily designated as minus; display means for displaying electrical signals from said detector transducers; said display means having at least two electrical input terminals; pulse generator means for simultaneously delivering an electrical pulse to the terminals of each of said generator transducers and to said display means; said pulse generator means having at least two electrical output terminals; an electrical connection between said pulse generator means and said display means; the improvement comprising (a) orientation of said pair of generator transducers such that the directional axis of one generator transducer is identical in compass direction to the directional axis of the second generator transducer, electrical connection between a first electrical output terminal of the pulse generator means and the plus electrical terminal of a first generator transducer and the minus electrical terminal of a second generator transducer, electrical connection between a second electrical output terminal of the pulse generator means and the minus electrical terminal of the first generator transducer and the plus electrical terminal of the second generator transducer in combination with (b) orientation of said pair of detector transducers such that the directional axis of one detector transducer is opposite in compass direction to the directional axis of the second detector transducer, electrical connection between a first electrical input terminal of the display means and the minus electrical output terminal of a first detector transducer, electrical connection between both plus electrical output terminals of the detector transducers, electrical connection between the minus electrical output terminal of a second detector transducer and a second electrical input terminal of the display means.

9. In an echo ranging borehole tool comprising a generator having at least one pair of generator transducers; said generator transducers being spaced laterally and located on opposite sides of the axis of the borehole; each of said generator transducers having a directional axis, an electrical terminal arbitrarily designated plus and an electrical terminal arbitrarily designated as minus; at least one pair of detector transducers spaced along the axis of said borehole from said generator transducers; said detector transducers spaced substantially laterally and located on opposite sides of the axis of said borehole; each of said detector transducers having a directional axis, an electrical output terminal arbitrarily designated as plus and an electrical output terminal arbitrarily designated as minus; display means for displaying electrical signals from said detector transducers; said display means having at least two electrical input terminals; pulse generator means for simultaneously delivering an electrical pulse to the terminals of each of said generator transducers and to said display means; said pulse generator means having at least two electrical output terminals; an electrical connection between said pulse generator means and said display means; the improvement comprising (a) orientation of said pair of generator transducers such that the directional axis of one generator transducer is identical in compass direction to the directional axis of the second generator transducer, electrical connection between a first electrical output terminal of the pulse generator means and the plus electrical terminal of a first generator transducer and the minus electrical terminal of a second generator transducer, electrical connection between a second electrical output terminal of the pulse generator means and the minus electrical terminal of the first generator transducer and the plus electrical terminal of the second generator transducer in combination with (b) orientation of said pair of detector transducers such that the directional axis of one detector transducer is opposite in compass direction to the directional axis of the second detector transducer, electrical connection between a first electrical input terminal of the display means and the minus electrical output terminal of a first detector transducer and the plus electrical output terminal of a second detector transducer, electrical connection between a second electrical input terminal of the display means and the plus electrical output terminal of the first detector transducer and the minus electrical output terminal of the second detector transducer.

10. In an echo ranging method for detecting formation inhomogeneities spaced a distance from a borehole by radiating into the formation surrounding the borehole a wave field having a predetermined spatial pattern by operating a generator within the borehole to generate forces which are equal and opposite in compass direction on opposite sides of the generator, locating a first motion detector on a first side of the axis of said borehole at a distance from said generator, and locating a second motion detector on a substantially opposite side of the axis of said borehole spaced substantially laterally from said first motion detector, each motion detector having a directional axis and a plus and a minus electrical output terminal, simultaneously sensing echoes with said first and said second motion detector, said first and said second motion detectors emitting electrical signals which are equal and identical in polarity when sensing forces which are equal in magnitude and identical in direction with reference to the directional axis; and displaying said signal, the improvements comprising:

a. positioning the axes of said motion detectors so that the first motion detector emits a positive signal in response to a given force received from said formation and the second motion detector emits a negative signal in response to the same force, and b. connecting the plus terminal of said first motion detector with the minus terminal of said second motion detector to provide a combined electrical signal, said combined signal being 0 when the motion detectors each sense forces which are identical in magnitude and opposite in direction.

11. The method of claim 10 wherein the spatial pattern of forces is generated by mechanical generator.

12. The method of claim 10 wherein the generator impacts a moving mass against a substantially stationary mass which is in contact with the walls of the borehole, and wherein said impact occurs in a direction substantially tangential to the walls of said borehole.

13. In the method of claim 10, electrically connecting the input to the generator and electrically connecting the output from the detector to provide a generator having negative symmetry and a detector having positive symmetry or vice versa.

14. The method of claim 13, wherein at least two pairs of detectors located on mutually perpendicular borehole diameters are employed.

15. In an echo ranging tool for use in a borehole comprising means for applying forces at two substantially opposite points on the wall of the borehole, said forces being tangent to the walls of the boreholes in the same rotary direction, and a detector means comprising at least one pair of detectors mounted on opposite sides of the axis of said borehole, said pair comprising a first motion detector located in contact with said borehole, and a second motion detector located in contact with said borehole at a point substantially opposite from said first motion detector, each motion detector having a plus and a minus terminal and emitting an electrical output in response to forces which impinge upon the point at which the motion detector contacts the borehole, the magnitude of said electrical signal being a function of the magnitude of the force and being a function of the direction of the force as measured by the angle which the force makes at a directional axis of the motion detector, the electrical signals from said first and said second motion detector being equal and identical in polarity when said first and said second motion detector are each sensing forces which are equal in magnitude and identical in direction, the electrical signals from said first and said second motion detector being equal and opposite in polarity when said first motion detector is sensing a force which is equal in magnitude and opposite in direction from the force then being sensed by said second motion detector, the improvement comprising electrical interconnection between the identical terminals of said first and said second motion detector in each of said pairs so that the combined electrical signal from any pair is zero when the motion detectors comprising that pair are each sensing forces which are identical in magnitude and opposite in direction, and so that the combined electrical signal is twice that emitted by either of the motion detectors when the motion detectors comprising that pair are each sensing forces which are identical in magnitude and identical in direction, said directional axis of said motion detectors being positioned substantially tangent to said borehole so that all of said pairs form a detector which is substantially insensitive to forces applied to the walls of the borehole by said means for applying forces.

16. The apparatus of claim 15 wherein the detector means are inertial motion detection devices.

17. The apparatus of claim 15 wherein the detector means comprise at least a pair of opposing quadrants of a transducer cylinder positioned so that said cylinder is substantially concentric with the borehole.

18. The apparatus of claim 17 wherein the transducer cylinder is composed of barium titanate.

* * * * *